United States Patent [19]

Yount

[11] Patent Number: 4,633,043

[45] Date of Patent: Dec. 30, 1986

[54] APPARATUS FOR USE WITH KEY TELEPHONE SYSTEMS

[75] Inventor: Robert L. Yount, Zephyrhills, Fla.

[73] Assignee: GTE Service Corporation, Stamford, Conn.

[21] Appl. No.: 829,585

[22] Filed: Feb. 14, 1986

[51] Int. Cl.[4] .............................................. H04Q 5/18
[52] U.S. Cl. ..................................... 379/33; 379/164
[58] Field of Search ................. 179/99 LS, 99 R, 84 L

[56] References Cited

U.S. PATENT DOCUMENTS

| | | | |
|---|---|---|---|
| 4,382,163 | 5/1983 | White et al. | 179/99 LS |
| 4,441,106 | 4/1984 | Jackson | 179/99 LS |
| 4,578,542 | 3/1986 | Alderman | 179/99 LS |

Primary Examiner—Gene Z. Rubinson
Assistant Examiner—David R. Schuster

Attorney, Agent, or Firm—Theodore C. Jay, Jr.

[57] ABSTRACT

Apparatus disposed at location of a key telephone system and associated with the system to produce a substitute signal and a substitute alarm in the presence of a ringing voltage when the system is deactuated. The apparatus comprises: an electrically powered lamp for displaying the substitute signal when a first voltage is applied thereto; an electrically powered device for sounding the substitute alarm when a second voltage is supplied thereto; a second source; and a circuit arrangement coupled to the first and second sources, the line, the lamp and the device. The arrangement, when the system is deactuated in the presence of the ringing voltage, produces the first and second voltages and applies same to the lamp and device respectively to cause the substitute signal to be displayed and the substitute alarm to be sounded.

7 Claims, 1 Drawing Figure

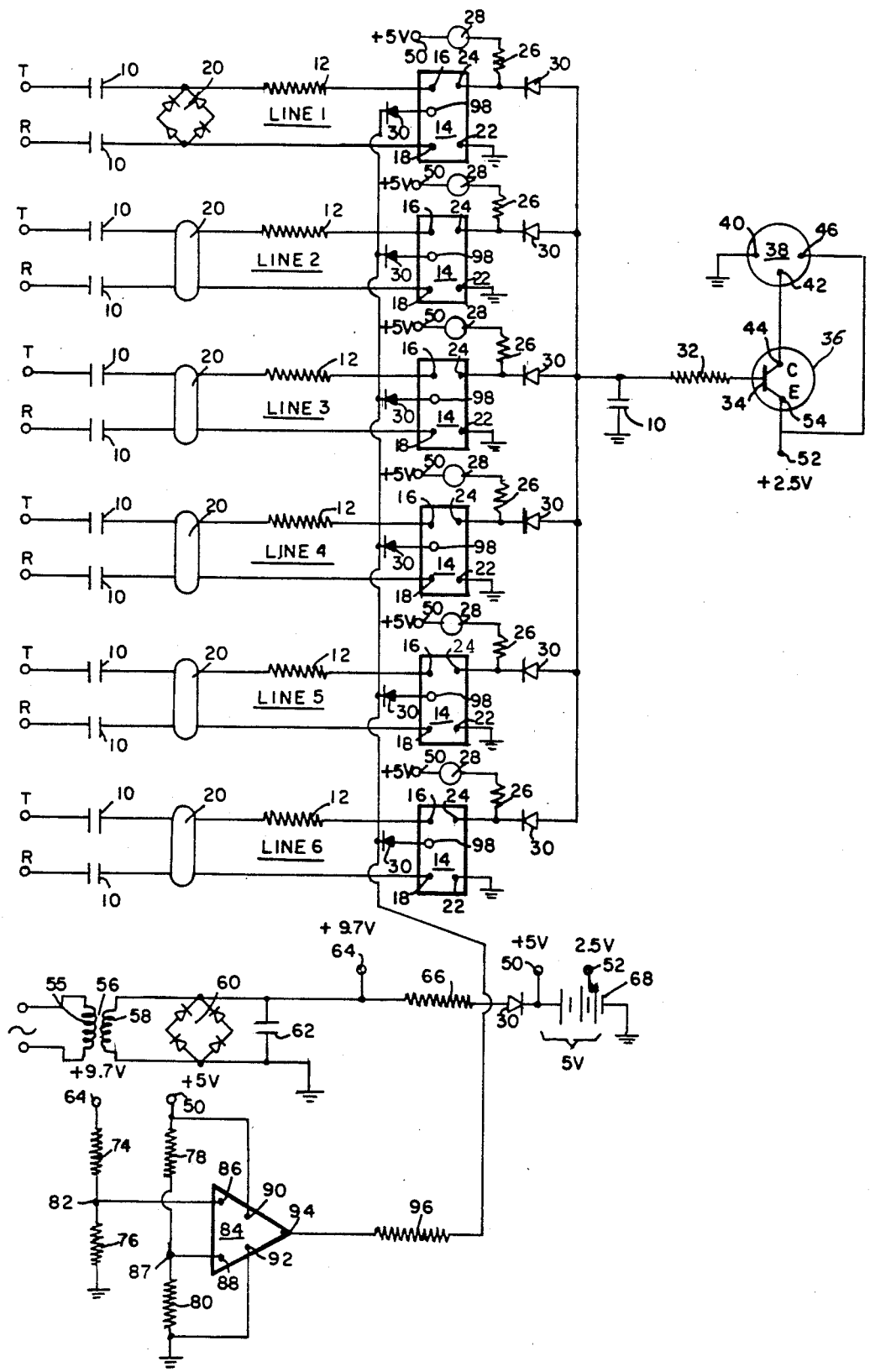

# APPARATUS FOR USE WITH KEY TELEPHONE SYSTEMS

BACKGROUND OF THE INVENTION

A key telephone system is a small local telephone system in a small office complex or home having a plurality of telephones which are interconnected, wherein each of the telephones has access to a smaller plurality of lines connected to a local telephone central office. Incoming telephone calls are routed selectively to the desired telephone by causing audible sounding of a ringer or the like in the selected phone and, at the same time, causing a lamp associated with this phone (such as a lamp disposed in a button in the selected phone) to flash.

The power to actuate the lamps and ringers is provided from a local source, typically an alternating current source. Should the supply of power to the system be cut off, these lamps and ringers become inoperative, and users of the system have no way of knowing that incoming calls are to be answered even though the system otherwise functions normally in originating or receiving calls. Consequently, incoming calls are not answered under such conditions.

The present invention is directed toward apparatus for use with key telephone systems which enables users of the system to receive and answer incoming calls when the supply of power from a local source is interrupted in the same manner as if the supply had not been interrupted. The apparatus includes substitute lamps and an audible alarm which are enabled when the supply is interrupted to function in such conditions in the same manner as the lamps and ringers utilized in normal operating conditions.

SUMMARY OF THE INVENTION

A key telephone system is disposed at a location remote from a telephone central office. The system is connected to the office by at least one telephone line. The office transmits an alternating ringing voltage along the line to the system when an incoming call to the system is to be placed on the line. The system is normally actuated by electrical power which is supplied thereto from a first source disposed at said location and is deactuated when power is not so supplied. The system, in the presence of the ringing voltage, provides a visual signal and an audible alarm when actuated and produces neither said signal nor said alarm when deactuated.

In accordance with the principles of the invention, apparatus is disposed at this location and is associated with this system to produce a substitute signal and a substitute alarm in the presence of the ringing voltage when the system is deactuated. The apparatus comprises an electrically powered lamp for producing the substitute signal when a first voltage is applied thereto; an electrically powered device for producing the substitute alarm when a second voltage is supplied thereto; a second source; and means coupled to the first and second sources, the line, the lamp and the device. The means, when the system is deactuated in the presence of the ringing voltage, produces the first and second voltages and applies same to the lamp and device respectively to cause the substitute signal to be displayed and the substitute alarm to be sounded.

BRIEF DESCRIPTION OF THE DRAWINGS

The accompanying FIGURE is a circuit diagram of one embodiment of the invention.

DETAILED DESCRIPTION OF PREFERRED EMBODIMENT

Referring now to the FIGURE, there is shown a six telephone line arrangement connected to a key telephone system (not shown). Each line consists of ring and tip conductors, identified as T and R respectively. These lines are identified as lines 1 through line 6 respectively.

Each of the tip conductors is connected via capacitor 10 and a current limiting resistor 12 to a terminal 16 of a corresponding optical-electrical semiconductor device 14. Each ring conductor is connected via another like capacitor 10 to another terminal 18 of device 14. The junction of each capacitor 10 and the corresponding terminal 18 is connected to the junction of the corresponding capacitor 10 and resistor 12 by a corresponding full wave diode bridge 20.

A third terminal 22 of each device 14 is grounded. Each device 14 has a fourth terminal 24 which is connected via a corresponding resistor 26 and a corresponding light emitter diode 28 to a point 50 (maintained at a direct positive potential of five volts) and also via a semiconductor diode 30 and resistor 32 to the base electrode 34 of transistor 36. The junction of diode 30 and resistor 32 is grounded via capacitor 10.

A chime 38 has one terminal 40 grounded, a second terminal 42 connected to collector electrode 44 of transistor 36 and a third terminal 46 connected to another point 52 (maintained at a direct positive potential of two and one half volts). The emitter electrode 54 of transistor 36 is also connected to point 52.

Incoming alternating current power is applied across the primary windling 55 of transformer 56. A full wave diode bridge 60 is shunted across the secondary winding 58 of this transformer. A capacitor 62 is shunted across the bridge 60 whereby a direct voltage of nine and seven tenths is developed thereacross and a direct positive potential of nine and seven tenths volts appears at point 64. Point 64 is connected through resistor 66, diode 30, and a five volt battery pack 68 to ground. A direct positive potential of five volts appears at point 50, disposed between diode 30 and pack 68, and a direct positive potential of two and one half volts appears at point 52 (connected to the second call of pack 68). A direct voltage of nine and seven tenths volts is applied across a voltage divider network of resistors 74 and 76 and a direct voltage of five volts is applied across a voltage divider network of resistors 78 and 80. The junction 82 of resistors 74 and 76 is connected to terminal 86 of a semiconductor device 84. The junction 87 of resistors 78 and 80 is connected to terminal 88 of device 84. A direct positive potential of five volts is applied to terminal 90 of device 84. Terminal 92 of device 84 is grounded. Terminal 94 of device 84 is connected via resistor 96 and separate diodes 30 to terminal 98 of each device 14.

The system then functions as follows. When alternating current power is present and the various direct voltages are produced, a low output voltage is produced between terminal 94 of device 84 and ground. This voltage is applied to each of devices 14, which then creates an inhibiting condition causing all of respective terminals 98 of devices 14 to be open circuited.

The light emitting diodes 28 are dark and the chime does not sound. This is the normal operating condition for the key system when functioning properly.

If the alternating power is interrupted, so that the lamps and ringers of the key system become inoperative, the battery pack continues to maintain the five volt and two and one half volt voltages at rated levels. However, the nine and seven tenths voltage disappears, causing terminal 94 of device 84 to be open circuited. If a ringing alternating voltage is then applied to any line, this voltage causes the terminal 98 of the corresponding device or devices 14 to be grounded during a portion of each half cycle of the ringing voltage whereby the corresponding diode or diodes 28 flashes to provide the desired visual signal. At the same time, this grounding action causes transistor 36 to be turned on and off causing the chime 38 to sound once each half cycle, thus providing the desired audible alarm.

Device 14 (opto-comp) is identified commercially by the identification number 4N35. Device (quad-comp) 84 is similarly identified as LM2901. Typically capacitor 10 can be rated at one microforad and capacitor 62 at forty-seven microforads; resistors 10, 26, 32, at ten thousand ohms, three hundred and thirty ohms and four hundred and seventy ohms respectively; resistors 66, 74 and 76 at seventy five ohms, thirty three thousand ohms and fifteen thousand ohms twenty seven thousand ohms and four hundred and seventy ohms respectively. The battery pack is identified commercially as 4-AANICAD. The diode bridges 20 used in the lines are similarly identified as WM404 while the bridge 60 is similarly identified as WM202.

What is claimed is:

1. For use with a key telephone system disposed at a location remote from a telephone central office, said system being connected to said office by at least one telephone line, said office transmitting an alternating ringing voltage along said line to said system when an incoming call to the system is to be placed on said line, said system normally being actuated by electrical power supplied thereto from a first source disposed at said location and being deactuated when said power is not so supplied, said system, in the presence of the ringing voltage, providing a visual signal and an audible alarm when actuated and producing neither said signal nor said alarm when deactuated:
   apparatus disposed at said location and associated with said system to produce a substitute signal and a substitute alarm in the presence of the ringing voltage when the system is deactuated, said apparatus comprising:
   an electrically powered lamp for displaying said substitute signal when a first voltage is applied thereto;
   an electrically powered device for sounding said substitute alarm when a second voltage is supplied thereto;
   a second source; and
   means coupled to said first and second sources, said line, said lamp and said device, said means, when the system is deactuated in the presence of the ringing voltage, producing the first and second voltages and applying same to said lamp and device respectively to cause said substitute signal to be displayed and said substitute alarm to be sounded.

2. For use with a key telephone system disposed at a location remote from a telephone central office, said system being connected to said office by a plurality of telephone lines, said office transmitting an alternating ringing voltage along a selected one of the lines to said system when an incoming call to the system is to be placed on said selected line, said system normally being actuated by electrical power supplied thereto from a first source disposed at said location and being deactuated when said power is not so supplied, said system, in the presence of the ringing voltage, providing a visual signal and an audible alarm which identifies the selected line when actuated and producing neither said signal nor said alarm when deactuated:
   apparatus disposed at said location and associated with said system to produce a substitute signal and a substitute alarm in the presence of the ringing voltage when the system is deactuated, said apparatus comprising:
   a like plurality of electrically powered lamps, each lamp being associated with a corresponding line for displaying said substitute signal when a first voltage is applied thereto:
   an electrically powered device for sounding said substitute alarm when a second voltage is supplied thereto, said substitute alarm being audible to all users of the system;
   a second source; and
   means coupled to said first and second sources, said lines, said lamp and said device, said means, when the system is deactuated in the presence of the ringing voltage, producing the first and second voltages and applying same to the lamp associated with the particular line carrying the ringing voltage and device respectively to cause said substitute signal to be displayed and said substitute alarm to be sounded.

3. The apparatus of claim 2 wherein said first source is an alternating current source and the second source is a direct current source.

4. The apparatus of claim 3 wherein said means includes first means coupled to the first source to derive therefrom a control voltage having a first value when the first source functions normally and a second value when the first source fails and second means coupled to said second source, said lamps, said device and said first means to disable said lamps and said device when the control voltage attains said first value and to cause said substitute signal and substitute alarm to be produced when the control voltage attains said second value and the ringing signal is present.

5. The apparatus of claim 4 wherein each of said voltages is pulsating, causing the associated lamp to have a pulsating light output and causing the device to produce spaced bursts of sound.

6. The apparatus of claim 5 wherein said lamps each include a light emitting diode.

7. The apparatus of claim 6 wherein the second means includes a like plurality of like semiconductor devices, each device being associated with a corresponding line, each device being connected to its corresponding line and the lamp associated therewith, all of said devices being connected in common to said device.

* * * * *